United States Patent [19]

Kommoss et al.

[11] 4,434,442
[45] Feb. 28, 1984

[54] AUTOMATIC REVERSE SYSTEM FOR TAPE RECORDER

[75] Inventors: Klaus Kommoss, Wetzlar-Naunheim; Heinz Schütte, Wetzlar, Fed. Rep. of Germany

[73] Assignee: U.S. Philips Corporation, New York, N.Y.

[21] Appl. No.: 294,265

[22] Filed: Aug. 19, 1981

[30] Foreign Application Priority Data

Aug. 30, 1980 [DE] Fed. Rep. of Germany ....... 3032807

[51] Int. Cl.³ ............................................ G11B 15/14
[52] U.S. Cl. .................................................. 360/74.2
[58] Field of Search ....................... 360/69, 74.1, 74.2, 360/96.3; 242/201

[56] References Cited

U.S. PATENT DOCUMENTS 4,000,514 12/1976 Fukatsu ........................ 360/74.2 X

FOREIGN PATENT DOCUMENTS 2440824 3/1976 Fed. Rep. of Germany .
2812935 10/1979 Fed. Rep. of Germany .
54-109806 8/1979 Japan ................................... 360/74.2
1182290 2/1970 United Kingdom .

Primary Examiner—Joseph A. Popek
Attorney, Agent, or Firm—David R. Treacy

[57] ABSTRACT

An automatic reverse system for magnetic tape cassette equipment having two capstans with associated pressure rollers and two drivable winding mandrels for the cassette reels. The direction of operation of the apparatus is reversed simply in that the drive motor is electrically switched from one direction of rotation to the opposite direction of rotation. Owing to this change of the direction of rotation a swing arm is changed over, which switches the drive mechanism from one winding mandrel to the other winding mandrel. The winding mandrel now driven in turn linearly moves a control plate, the plate pivots a lever transmission which in turn moves a head support, (via) having stops which lift the pressure roller off the one capstan and permit the other pressure roller to be applied to the other capstan.

13 Claims, 2 Drawing Figures

AUTOMATIC REVERSE SYSTEM FOR TAPE RECORDER

BACKGROUND OF THE INVENTION

The invention relates to an automatic reverse system for a tape recorder, which system comprises two driven capstans for the transport of a recording tape such as a magnetic tape; an associated pressure roller, arranged on a pivotal lever, being engageable with one of said capstans depending on the direction of movement of the tape, which pivotal lever is pivotable by a driven control plate having two fixed end positions, and two winding mandrels for the reels, which are alternately engageable with the drive motor via a pivotal transmission, whose pivotal position depends on the direction of rotation of the drive motor.

Such a system is known from U.S. Pat. No. 3,684,209 which discloses such a mechanism in which the control plate is constituted by a two-armed lever, which is pivotable about an axis. One lever arm is provided with diverging extensions which urge either the one or the other pivotal lever with the corresponding pressure roller away from the capstan. The control plate can be pivoted by means of an eccentric gear cam, which engages a fork of the control plate. The winding mandrels are switched over by means of the control plate via a rod transmission. The capstans are driven separately.

This construction demands a relatively large space in a cassette recorder. In cassette recorders, specifically those to be built into motor-cars, only a limited space is available. Bulky constructions, in particular constructions demanding a large surface area, are therefore not suitable.

SUMMARY OF THE INVENTION

It is an object of the invention to provide an automatic reverse system in which all functions can be switched automatically to operation in the reverse direction by merely changing the direction of rotation of the drive motor.

According to the invention a system of the type mentioned in the opening paragraph solves this problem, in that during normal operation the pivotal transmission drives the winding gears associated with the driven winding mandrel, that the control plate is linearly movable and comprises switching portions associated with the winding gears, that during reversal of the direction of rotation and the consequent pivotal movement of the pivotal transmission, during which the winding gear driven so far is stopped and the stationary winding gear is set into rotation, the control plate is shifted in such a way by the winding gear which now rotates that via a lever mechanism it positions the pressure roller associated with the rotating winding gear against the associated capstan, the other pressure roller being pivoted away simultaneously.

Owing to this construction a reversal of the direction of rotation of the drive motor triggers a kind of chain reaction, such that one function reversal causes a further function reversal until all drive elements have been switched to operation in the reverse direction.

By the use of a linearly movable control plate having switching portions room is available in the recorder for accommodating the gear wheels necessary for the tape transport, such as transmission gears and flywheels. By changing over the pivotal transmission, which is effected automatically in response to a change of the direction of rotation, the control plate is also shifted and this control plate in turn then changes over the pressure rollers. Thus, all change-over movements are initiated merely, without any additional measures, by a change of the direction of rotation of the drive motor.

From German "Offenlegungsschrift" No. 24 40 824 it is known to drive the winding mandrels via a link motion on which the transmission gears are arranged. The link motion oscillates about the motor shaft and, through frictional coupling, causes the transmission gear to engage either with the spindle of the one or the spindle of the other winding mandrel, depending on the direction of rotation of the motor.

A further embodiment of the invention is characterized in that the pivotal transmission comprises a swing arm and at least one swing-arm gear arranged thereon, which gear is associated with a commutator, which in the absence of control signals produced in the stationary condition causes a reversal of the direction of rotation of the drive motor. By arranging the commutator on a swing-arm gear this gear is not only used for driving the winding mandrels, but also for detecting the operational condition of the recorder.

A further embodiment of the invention is characterized in that on the free end of the swing arm two swing-arm gears are arranged one on tops of the other, that one of the swing-arm gears is continuously driven by the drive motor, and that the last-mentioned swing-arm gear drives the other swing-arm gear provided with the commutator via a slipping clutch. Thus, the gear wheels on the swing arm, via the slipping clutch arranged between them, limit the torque exerted on the winding mandrels. In this way only one torque limiting slipping clutch for the two winding mandrels is required.

A further embodiment of the invention is characterized in that depending on the position of the swing arm the swing-arm gear provided with the commutator drives the winding gear of the winding mandrel which is in the pivoted position and the other, continuously driven swing-arm gear drives the switching gears associated with said winding mandrel and co-operating with the switching portions. Thus, via the swing-arm gears, depending on the pivotal position of the pivotal transmission, the drive mechanism drives the winding gear associated with the relevant winding mandrel via the slipping clutch and drives the associated switching gear directly, which except for the switching intervals rotates freely in the driven condition.

A further embodiment of the invention is characterized in that during fast forward or reverse winding the swing-arm gears of the pivotal transmission are by-passed by means of a bypass gear. This gear ensures that during fast forward or reverse winding the slipping clutch is rendered inoperative. The full driving torque is then applied to the winding mandrel being driven.

In accordance with a further embodiment of the invention the switching portions of the control plate comprise gear-rack segments, which co-operate with switching pinions associated with the switching gears and with the swing-arm gear without commutator. Such gear-rack segments provide precise engagement.

In accordance with a further embodiment of the invention the switching gears are journalled on the winding spindles of the winding mandrels so as to be freely rotatable. Thus, no further spindles and no further space are required for the switching gears.

A further embodiment of the invention is characterized in that in the gear-rack segments have such a length and are arranged in such a way relative to the switching pinion that the gear-rack segment, which during change-over of the pivotal transmission meshes with the switching gear which has been set into rotation or the switching pinion, shifts the control plate via the associated gear-rack segment from one end position to the opposite end position, in which the segment is disengaged, whilst the other gear-rack segment, which was previously disengaged, meshes with the switching pinion, which now rotates freely. Owing to the limited length of the gear-rack segments and their arrangement the segments disengage themselves.

Furthermore, it is advantageous if the control plate is latched in its two end positions by means of an over-center spring. This latching in the end positions ensures a correct engagement during operation.

A further embodiment of the invention is characterized in that the pivotal levers carrying the pressure rollers take the form of angular levers and are arranged on a head support carrying the magnetic head so as to be pivotable their angular portions, that the angular levers carry the pressure rollers on one end of a lever arm, that a tension spring acts on the other lever-arm end, and that the head support with the magnetic head and the pressure rollers can be moved away from the tape against the force of the springs.

Finally, in accordance with a further embodiment of the invention, the control plate, which is arranged on a chassis edge, transmits switching movements initiated by the pivotal transmission to a double-armed lever arranged on an adjacent chassis edge, which lever in turn transmits said movements via a slide arrange on a further adjoining chassis edge to the pivotal levers which can be pivoted by the slide. Switching over is then effected via components surrounding the central part of the tape deck.

An embodiment of the invention will now be described in more detail with reference to the accompanying drawing.

DESCRIPTION OF THE PREFERRED EMBODIMENT

Figure 1:
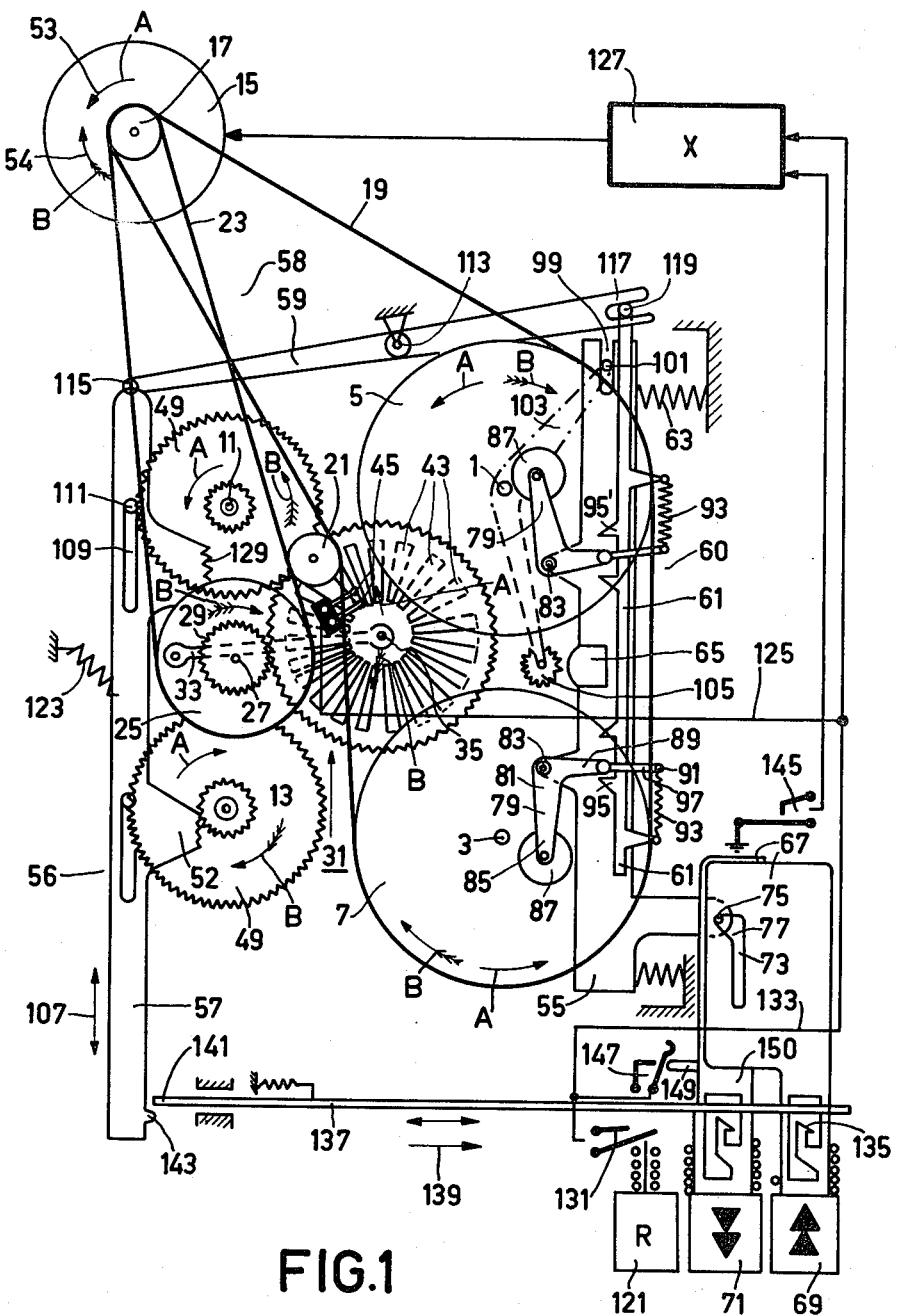
FIG. 1 is a schematic plan view of the drive mechanism in accordance with the invention together with associated electrical circuitry.

The drive mechanism is in particular intended for automatic reverse operation of cassette recorders. Such reverse operation has the advantage that the cassette can be played continuously in the forward or reverse mode without removal.

The mechanism comprises two capstans 1 and 3, which are provided with flywheels 5 and 7. The winding mandrels 9 (FIG. 2) are arranged on drive spindles 11 and 13.

The mechanism is driven by a reversible drive motor 15. A belt 19, which runs over a pulley 17 of the drive motor, drives the flywheels 5 and 7. An additional tensioning roller 21 provides the necessary belt tension. A further belt 23 is passed over the pulley 17 and drives a drive wheel 25. A drive gear 29 is mounted on the spindle 27 of the drive wheel 25.

A pivotal transmission 31 cooperates with the drive gear 29 of the drive wheel 25, and comprises a swing arm 33, which is arranged eccentrically relative to the drive gear spindle 27 near the drive wheel 25 so as to be pivotable relative to the chassis, not shown. A transmission gear 37 and a commutator gear 39 are arranged to be rotatable on the free end 35 of the swing arm 33 parallel to each other and above each other. The two gears 37 and 39 are connected to each other via a slipping clutch 41. The transmission gear 37 is constantly in mesh with the drive gear 29 of the drive wheel 25. On its upper side the commutator gear 39 is provided with a commutator ring 43, which ring cooperates with a commutator device 47 provided with spring contacts 45.

Figure 2:
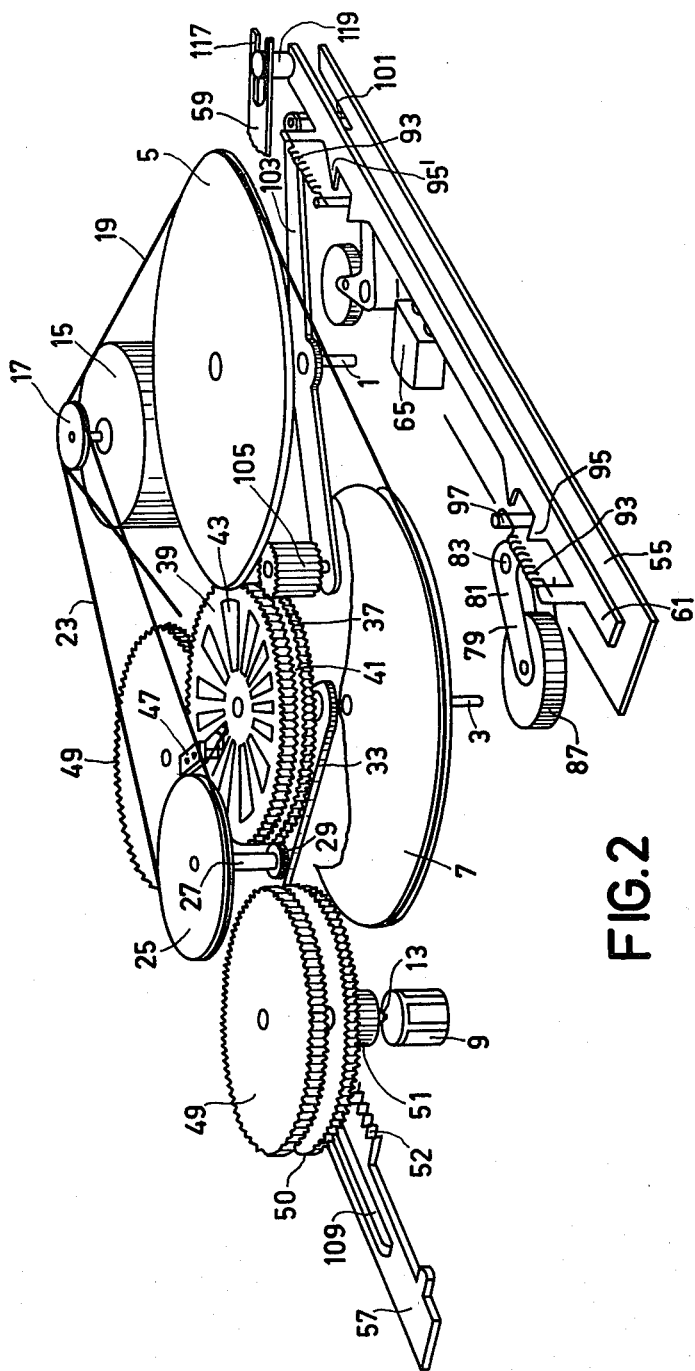
FIG. 2 is a perspective view of the parts of the drive mechanism of FIG. 1 which co-operate with each other.

The winding gears 49 are rigidly connected to the winding spindles 11 and 13, as is shown in FIG. 2. Parallel to the winding gears 49 switching gears 50 are arranged to be freely rotatable on the winding spindles 11 and 13. Switching pinions 51, which cooperate with gear-rack segments 52, are rigidly coupled to the switching gears 50. The switching gears 50 and pinions 51 are not involved in the tape transport by the winding mandrels 9 and are arranged to be freely rotatable on the winding spindles 11 and 13 in order to simplify the construction. The distance between the winding gears 49 and the switching gears 50 corresponds to the distance between the gears 39 and 37 of the swing arm 33. Therefore, the upper gears 39 and 49 as well as the lower gears 37 and 50 are situated in the same horizontal planes.

Switching over from reverse to forward operation is effected by means of the drive motor 15. The forward direction is indicated by the smooth arrows 53 and A, the smooth arrows for the motor 15 bearing the reference numeral 53. The reverse direction is indicated by means of the feathered arrows 54 and B.

In addition to the electrical reversal of the direction, mechanical reversals are necessary, because the drive should be changed from the capstan 1 and the winding spindle 11 to the capstan 3 and the winding spindle 13 or vice versa. Mechanical change-over is achieved by means of a control plate 57 which is axially movable along a chassis edge 56, a double-armed lever 59, which is adjustable by said control plate and is arranged on an adjacent shorter chassis edge 58, and a head slide 61, which is adjustable by the lever 59 along the next longer chassis edge 60. Thus, the control plate 57 determines the movements of the head slide 61 via the lever 59. The control plate 57, the lever 59 and the head slide 61 are connected by pivots 115 and 119. The head support 55 is mounted on the apparatus by means of pressure springs 63, which urge the head support with the magnetic head against the tape, not shown. For fast forward and fast reverse operation it is advisable to lift the magnetic head 65 off the tape. This is effected by means of control plates 67, which are connected to the fast-forward button 69 and the fast-reverse button 71. Each control plate is formed with a slot 73, which is engaged by a pin 75 (not shown in FIG. 2) of the head support 55. When one of the buttons 69 and 71 is depressed, the pin 75 moves along an oblique face 77 and pulls the head-support 55 away from the tape against the action of the spings 63.

Angular levers 79 are arranged on the head support 55 to be pivotal about axes 83 near the angular portion 81 of each lever. On one end 85 the angular levers each carry a pressure roller 87. The other end 89 is attached to a respective tension spring 93, which connects it to the head slide 61. Moreover, the head slide 61 has stops 95, which can butt against the attachment pins 87 of the tension springs 93.

The head support 55 is provided with a fork guide 99. This fork guide 99 engages with a pin 101 mounted on one end of a double-armed lever 103, which is freely rotatable about the capstan 1. On the end of the lever 103 which is remote from the end with the pin 101 a bypass gear 105 is arranged. This gear 105 can interconnect the gears 37 and 39 with each other and thereby render the slipping clutch 41 inoperative.

The control plate 57 is axially movable in the direction of a double-headed arrow 107, the slots 109 being guided along stationary pins 111. The slots 109 limit the travel of the control plate 57. The gear rack segments 52, which are adapted to engage the switching pinion 51, are arranged on the control plate. The double-armed lever 59, which is pivotable about a pivot 113, has a pivotal connection 115 with the control plate 57. The double-armed lever 59 therefore follows the movement of the control plate 57. On the end which is remote from the pivot 115 the double-armed lever 59 is provided with a fork guide 117, which guides a pin 119 which belongs to the head slide 61. Thus, the movements of the control plate 57 are transmitted directly to the head slide 61.

Automatic reverse operation will now be described in more detail hereinafter, the buttons for fast forward 69, fast reverse 71 and manual reverse operation 121 not being considered, for the time being.

It is assumed that the pulley 17 rotates in the direction of the smooth arrow 53. The swing arm 33 has then pivoted in the direction of the smooth arrow A and the commutator gear 39 meshes with the winding gear 49 of the winding spindle 11. The drive mandrel 9 of the winding spindle 11 is thus driven and takes up the tape supplied to it. The winding gear 49 of the winding spindle 13 rotates freely, thereby allowing the tape to be unwound from this spindle. The control plate 57 has shifted in the direction of the smooth arrow A and an over-center spring 123 maintains the control plate 47 in this end position. One of the tension springs 93 presses the pressure roller 87 associated with the capstan 1 against said capstan 1. The capstan 1 and the flywheel 5 revolve in the direction of the smooth arrow A. The capstan 1 and the associated pressure roller 87 feed the tape past the magnetic head 65 with the desired speed. At the end of the tape the winding spindle 13 is stopped by the tape end.

When the winding spindle 13 stops, the winding gear 49 of the winding spindle 11 is also stopped via the tape. The commutator gear 39 then also stops. The commutator ring 43 is then also stationary and the commutator device 47 produces a signal to indicate that the commutator ring 43 and the commutator gear 39 are stationary. Via a control line 125 a corresponding signal is supplied to the reversing circuit 127. This reversing circuit processes the signal in such a way that the direction of rotation the motor 15 is reversed. The motor 15 is now started in the direction of the feathered arrow 54. The drive gear 25 is then also rotated in the direction of the feathered arrow. The drive pinion 29 now moves the swing arm 33 in the direction of the feathered arrow via the transmission gear 37 and causes the swing arms to change over. The gears 37 and 39 then mesh with the switching gear 50 and the winding gear 49 of the winding spindle 13 and are thus rotated. The switching pinion 51 of the winding spindle 13 engages with the gear rack segment 52 and moves the control plate 57 in the direction of the feathered arrow past the center of the spring 123. The shifting process is terminated when the plate 57 has reached its other end position, in which it is latched by means of the over-center spring 123. In this end position the gear-rack segment 129 engages the switching pinion 51 of the winding spindle 11. The gear-rack segment 52 is now disengaged from the switching pinion 51 on the winding spindle 13.

Via the two-armed lever 59 the head slide 61, coupled to the control plate 57, is slid in the opposite direction. This means that the nose 95' of the head slide 61 has urged the angular lever 79 away from the capstan 1 and the tension spring 93 near the capstan 3 has swing the corresponding angular lever 79 with the pressure roller 87 against the capstan 3. In this way automatic reversal is completed and the tape is now played in the opposite direction, the two capstans and in particular the capstan 3 which is now operative, rotating in the direction of the feathered arrow 3.

In addition to automatic reverse operation, manual operation is possible. One possibility to achieve this is to press a reversing button 121. Upon depression of said reversing button a wiper switch 131 is actuated, which via a line 133 supplies a reversing signal to the reversing circuit 127. Thus, reversal of the play mode may also be initiated manually. The switching operation proceeds as described in the foregoing.

Generally, it is also required to proceed to another passage on the tape by fast forward or reverse winding. For this purpose the buttons 69 and 71 have been provided. When the fast-forward button 69 is depressed, it moves a rod 137 in the direction of an arrow 139 via a control plate 135 and thereby releases an interlock between its end 141 and a nose 143 of the control plate 57. Furthermore, the fast-forward button 69 moves the head support and thus the magnetic head away from the tape against the direction of compression of the spring 63 via the oblique face 77. Furthermore, a switch 145 is closed, which ensures that the drive motor 15 receives the full supply voltage. When the fast-forward button 69 is released the play mode is continued in the same direction.

When the fast-reverse button 71 is depressed, in the same way as for the fast-forward button, the latching rod 137 is first moved in the direction of the arrow 139. Via the oblique face 77 the head support is moved away from the tape and a wiper contact 147 provides the reversal of the direction of the drive mechanism in that a nose 149 of the push-button rod 150 acts on the said contact 147. Thus, when the fast-reverse button 71 is depressed the direction of tape transport is also reversed. Since the switch 145 is closed again, the tape speed again increases. When the button 71 is released the contact 147, which is actuated again, reverses the direction of the drive motor and thus of the entire drive mechanism. The tape speed is then reduced to the normal playing speed.

When the tape speed is increased it not unlikely that the slip of the slipping clutch 41 becomes excessive, so that tape transport is no longer effected with the desired speed. In order to overcome this problem the lever 103 has been provided. Each time that the control plate 47 moves the head support 55 away from the tape against the action of the spring 63, the lever 103 is pivoted so far that the bypass wheel 105 engages the two gears 37 and 39. In this way in the slipping clutch 41 is bypassed.

This means that the winding gears 49 are driven by the drive gear 29 without slipping. When the button 69 or 71 is released and the corresponding push-button rods return, the head support 55 is again moved against the tape via the pressure springs 63 and the bypass gear 105 is disengaged from the gears 37 and 39.

What is claimed is:

1. An automatic reversing drive system for a tape recorder, comprising
   a drive motor,
   two winding mandrels for tape reels, and a respective winding gear associated with each mandrel,
   a pivotal transmission whose pivotal position is dependent on the direction of rotation of said motor, arranged for alternately engaging one or the other of said mandrel winding gears for driving the mandrel by the drive motor,
   two driven capstans for respective transport of tape in one direction or the opposite direction,
   at least one pivotal lever,
   a control plate having two fixed end positions arranged for pivoting said lever,
   a pressure roller arranged responsive to pivoting of said lever for selective engagement with one of said capstans for driving the tape in one direction of tape movement, and
   a pressure roller arranged for alternate engagement with the other capstan for driving the tape in the opposite direction of tape movement,
   characterized in that said control plate is linearly movable between said end positions and comprises a respective switching portion associated with each winding gear, arranged such that during reversal of direction of motor rotation and associated pivotal movement of the transmission, during which reversal the previously driven winding gear is stopped and the previously stationary winding gear is set in motion, said control plate is shifted by the winding gear which has been set in motion, and
   said system comprises means for pivoting said at least one lever in response to shifting of the control plate arranged so that the pressure roller associated with the capstan for tape movement in the direction of the winding gear set in motion is positioned against that capstan, and the other pressure roller is pivoted away from the other capstan.

2. A system as claimed in claim 1, characterized in that the pivotal transmission comprises a swing arm, at least one swing-arm gear arranged thereon, and a commutator associated with said swing-arm gear; and the system comprises means for sensing a stationary condition of the commutator and in response thereto reversing the direction of rotation of the drive motor.

3. A system as claimed in claim 2, characterized in that two swing-arm gears are arranged coaxially, one above the other on the free end of the swing arm; one of the swing-arm gears is continuously driven by the drive motor; the commutator is rigidly connected to the other swing-arm gear; and said other swing-arm gear is driven by said one swing-arm gear through a slipping clutch.

4. A system as claimed in claim 3, characterized in that a respective switching gear is mounted coaxial with each winding mandrel, and arranged to cooperate with a respective switching portion of the control plate; and that, depending on the swing arm position, the swing-arm gear provided with the commutator drives the winding gear of one winding mandrel while the other, continuously driven swing-arm gear, drives the switching gear associated with said one mandrel.

5. A system as claimed in claim 4, characterized by comprising a bypass gear, and means for moving the bypass gear into engagement with both of the swing-arm gears of the pivotal transmission during fast forward or fast reverse winding.

6. A system as claimed in claim 4, characterized in that the switching gears are journalled to be freely rotatable on the winding spindles of the winding mandrels.

7. A system as claimed in claim 4, characterized in that the control plate switching portions comprise gear-rack segments respectively arranged alternately to engage a respective switching pinion associated with the respective switching gears.

8. A system as claimed in claim 7, characterized in that the switching gears are journalled to be freely rotatable on the winding spindles of the winding mandrels.

9. A system as claimed in claim 7, characterized in that the gear rack segments have such a length and are so arranged relative to the switching pinions that the gear rack segment, which during change-over of the pivotal transmission meshes with the switching gear which has been set into rotation, shifts the control plate from one end position toward the opposite end position; and upon complete movement of the control plate to said opposite end position the segment which initiated the movement becomes disengaged, while the other gear rack segment which was previously disengaged now meshes with the other switching pinion.

10. A system as claimed in claim 9, characterized by comprising an over-center spring for moving the control plate and holding it in either of its two end positions.

11. A system as claimed in any one of claims 1-10, characterized by comprising a head support on which at least one magnetic head is mounted; two angular levers pivotally mounted to the head support near their angular portions, one of said angular levers being said at least one pivotal lever, each angular lever having one lever arm end carrying a respective one of said pressure rollers, and a second lever arm end; a respective tension spring arranged to act on said other lever arm end of each angular lever to bias the pressure roller toward the respective capstan; and means for moving the head support with the magnetic head and pressure rollers away from the tape.

12. A system as claimed in claim 11, characterized by comprising a slide arranged along a chassis edge adjoining said pivotal levers; means for alternately moving one or the other angular levers responsive to movement of the slide so as alternately to pivot one or the other pressure roller away from the respective capstan; and a double-armed lever pivotally arranged on a chassis edge adjacent said chassis edge, having respective arms connected to said slide and said control plate for moving the slide responsive to movement of the control plate.

13. A system as claimed in claim 1, characterized by comprising a slide arranged on a chassis edge adjacent said pressure rollers and mounted for linear movement; means for alternately moving one or the other pressure roller away from the respective capstan responsive to movement of the slide; and a double-armed lever arranged on a chassis edge adjacent said chassis edge, having respective arms connected to said slide and said control plate, for linearly moving said slide responsive to linear movement of said control plate.

* * * * *

UNITED STATES PATENT AND TRADEMARK OFFICE
CERTIFICATE OF CORRECTION

PATENT NO. : 4,434,442
DATED : February 28, 1984
INVENTOR(S) : KLAUS KOMMOSS ET AL It is certified that error appears in the above-identified patent and that said Letters Patent is hereby corrected as shown below:

In the Abstract:

Abstract line 13, delete ", (via)"

Signed and Sealed this

Seventh Day of August 1984

[SEAL]

Attest:

GERALD J. MOSSINGHOFF

Attesting Officer

Commissioner of Patents and Trademarks